United States Patent
Kumar et al.

(10) Patent No.: US 12,254,015 B1
(45) Date of Patent: Mar. 18, 2025

(54) SYSTEMS AND METHODS FOR RELATIONAL DATABASE INSIGHT EXTRACTION AND VISUALIZATION

(71) Applicant: PwC Product Sales LLC, New York, NY (US)

(72) Inventors: Gaurav Kumar, Karnataka (IN); Kanak Dahake, Maharashtra (IN); Chakkarapani Vijayakumar, Chennai (IN); Saurabh Mohanty, Los Gatos, CA (US); Joseph David Voyles, Louisville, KY (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 18/622,411

(22) Filed: Mar. 29, 2024

(51) Int. Cl.
  *G06F 16/242* (2019.01)
  *G06F 16/2457* (2019.01)
  *G06F 16/248* (2019.01)

(52) U.S. Cl.
  CPC ...... *G06F 16/24575* (2019.01); *G06F 16/243* (2019.01); *G06F 16/248* (2019.01)

(58) Field of Classification Search
  CPC . G06F 16/24575; G06F 16/243; G06F 16/248
  See application file for complete search history.

(56) References Cited

U.S. PATENT DOCUMENTS

| | | | |
|---|---|---|---|
| 11,960,514 B1* | 4/2024 | Taylert | G06F 16/3329 |
| 12,105,729 B1* | 10/2024 | Haq | G06F 16/93 |
| 2017/0262502 A1* | 9/2017 | Rastunkov | G06F 16/2452 |
| 2019/0377728 A1* | 12/2019 | Cai | G06F 16/248 |
| 2022/0101188 A1* | 3/2022 | Lourentzou | G06F 16/243 |
| 2022/0342873 A1* | 10/2022 | Indurkhya | G06F 16/24522 |
| 2024/0249081 A1* | 7/2024 | UzZaman | G06F 40/40 |
| 2024/0338848 A1* | 10/2024 | Zhu | G06V 10/774 |

* cited by examiner

*Primary Examiner* — Jorge A Casanova
(74) *Attorney, Agent, or Firm* — Morrison & Foerster LLP

(57) ABSTRACT

A system for processing relational database data using a generative artificial intelligence (AI) language models is provided. The system receives relational database data and generates, based on the relational database data, schema data. The system also receives a user query input. The system generates and provides a first prompt to a generative AI language model, based on the user query input and the schema data. The system responsively receives, from the generative AI language model, an indication of a first subset of the database data identified as relevant to the query. The system generates and provides a second prompt to the generative AI language model, based on the user query input and the identified first subset. The system responsively receives, from the generative AI language model, an output comprising insight data generated based on the user query input and the identified first subset of the database data.

23 Claims, 10 Drawing Sheets

| Denor mTable 3 | Table3_Column1 | Table3_Column2 | Common_Column1 | Common_Column2 | Common_Column3 | Table1_Column1 | Table2_Column1 | Table2_Column2 |
|---|---|---|---|---|---|---|---|---|
| Table3_Column1 | 1 | 0.1 | 0.87 | 0.13 | 0.7 | 0.42 | 0.22 | 0.62 |
| Table3_Column2 | 0.1 | 1 | 0.2 | 0.11 | 0.4 | 0.66 | 0.27 | 0.77 |
| Common_Column1 | 0.87 | 0.2 | 1 | 0.8 | 0.5 | 0.99 | 0.88 | 0.13 |
| Common_Column2 | 0.13 | 0.11 | 0.8 | 1 | 0.63 | 0.37 | 0.32 | 0.02 |
| Common_Column3 | 0.7 | 0.4 | 0.5 | 0.63 | 1 | 0.48 | 0.41 | 0.17 |
| Table1_Column1 | 0.42 | 0.66 | 0.99 | 0.37 | 0.48 | 1 | 0.57 | 0.95 |
| Table2_Column1 | 0.22 | 0.27 | 0.88 | 0.32 | 0.41 | 0.57 | 1 | 0.83 |
| Table2_Column2 | 0.62 | 0.77 | 0.13 | 0.02 | 0.17 | 0.95 | 0.83 | 1 |

FIG. 4

SYSTEMS AND METHODS FOR RELATIONAL DATABASE INSIGHT EXTRACTION AND VISUALIZATION

FIELD

The present disclosure relates generally to systems and methods for data insight generation, and more specifically to relational database insight extraction and visualization using generative artificial intelligence.

BACKGROUND

Producing detailed analytics from data contained within large databases often requires advanced technical knowledge of statistics and database language. According to known techniques, users may manually apply data formatting, data extraction, data filtering, statistical analysis, insight generation, and visualization generation techniques. Alternatively, purpose-built models may be manually configured and deployed for each stage of the data processing and insight/visualization generation pipeline.

SUMMARY

As described above, data processing and statistical analysis for the generation of insights and/or visualizations requires, according to known techniques, advanced technical knowledge of statistics and database language by the user, and relies on manual configuration and/or purpose-built models for various stages of the data processing and insight/visualization generation pipeline.

However, even for users with the required advanced technical knowledge of statistics and database language, known analytical techniques may provide a limited range of information, requiring users to combine different solutions to obtain holistic understanding. Furthermore, application of manual techniques and/or configuration and deployment of known purpose-built models may offer limited flexibility and adaptability to quickly and easily process diverse user inputs for analysis of diverse data sets and generation of diverse insights and visualizations. Accordingly, there is a need for improved systems and methods for data processing, statistical analysis, and generation of insights and visualizations without requiring manual user configuration of purpose-built models and without requiring advances user knowledge of statistics and database language. Provided herein are systems and methods that may address the above identified need, including by leveraging generative artificial intelligence (AI) language models to process user inputs requesting insights and/or visualizations based on relational database data.

As explained herein, in some embodiments, generative AI language models may be used to select a subset(s) of relational database data that is relevant to a user query, including by analyzing database schema data to identify a primary (most relevant) column of the relational database data. One or more secondary columns may then be identified by using a correlation matrix to determine secondary columns that are related to the identified primary column. Data content for the one or more identified primary and secondary columns may then be extracted from the relational database for downstream analysis by an AI language model (e.g., the same AI language model as was used for selection of the primary column(s)) to generate insights and/or visualizations.

In addition to recognizing the potential for leveraging generating AI language models to process user inputs to generate insights and visualizations based on relational database data, the inventors have also recognized that use of generative AI language models to process relational database data may require addressing limitations of many generative AI language models on the number of prompt tokens that can be accepted at once. In order to address prompt token limitation issues, the techniques disclosed herein further provide for techniques for selecting a subset(s) of relational database data, and then filtering or otherwise processing the selected subset of relational database data to generate a concise representation of the selected data subset(s). The concise representation may be able to be processed within the token limitations of known generative AI language models, such that the generative AI language model can generate textual insights and/or visualizations based at least in part on the concise representation of the relational database data.

In some embodiments, a system for processing relational database data using a generative artificial intelligence (AI) language model is provided, the system comprising one or more processors and memory storing instructions that, when executed by the one or more processors, cause the system to: receive relational database data; generate, based on the relational database data, schema data in text string format; receive a user query input; generate and provide a first prompt to a generative AI language model, wherein the first prompt is generated based on the user query input and based on the schema data; receive, from the generative AI language model, in response to the first prompt, an indication of a first subset of the database data that is identified as relevant to the user query; generate and provide a second prompt to the generative AI language model, wherein the second prompt is generated based on the user query input and based on the identified first subset of the database data; and receive, from the generative AI language model, in response to the second prompt, an output comprising insight data generated based on the user query input and based on the identified first subset of the database data.

In some embodiments, the insight data is textual. In some embodiments, the insight data is visual. In some embodiments, the instructions cause the system to apply a denormalization operation to the relational database data. In some embodiments, the denormalization operation comprises computation of one or more adjacency matrices. In some embodiments, the instructions cause the system to use a Depth-First Search (DFS) algorithm to traverse the one or more adjacency matrices. In some embodiments: the instructions cause the system to: generate a correlational matrix based on the database data, wherein the correlational matrix represents a plurality of correlations between a plurality of subsets of the database data; and identify, based on the identified first subset of the database data that is identified as relevant to the user query, and based on the correlational matrix, a second subset of the database data that is relevant to the user query; the second prompt is generated based on the first and second subset of the database data; and the output comprising insight data is based on the first and second subset of the database data. In some embodiments, the instructions cause the system to calculate one or more correlations using a Chi-Square test. In some embodiments, the instructions cause the system to calculate one or more correlations using a Pearson coefficient. In some embodiments, the instructions cause the system to calculate one or more correlations using an analysis of variance technique. In some embodiments, identifying a second subset of the database data comprises placing a lower limit on correlation values. In some embodiments: the instructions cause the system to: retrieve data content from the database based on the identified first subset of the database data; and apply a data modification operation to generate a compressed representation of the retrieved data content; the second prompt is generated based on the compressed representation of the retrieved data content; and the output comprising insight data is based on the portion of the retrieved data content. In some embodiments, the data modification operation comprises a filtering operation that selects a portion of the retrieved data content. In some embodiments, the filtering operation is based on the cardinality of the retrieved data content. In some embodiments, the data modification operation comprises sorting the retrieved data content based on cardinality. In some embodiments, the data modification operation comprises forming a grouping of retrieved data content using a sliding window technique. In some embodiments, the data modification operation comprises application of an aggregation function to the grouping of retrieved data content. In some embodiments, the instructions cause the system to select the aggregation function based on the schema data. In some embodiments, the instructions cause the system to: generate and provide a third prompt to the generative AI language model, wherein the third prompt is generated based on the user query input and based on the identified first subset of the database data; and receive, from the generative AI language model, in response to the third prompt, an output comprising a visualization data generated based on the user query input and based on the identified first subset of the database data. In some embodiments, the instructions cause the system to receive a visualization from the generative AI language model based on the visualization data. In some embodiments, the instructions cause the system to receive a visualization from a visualization engine based on the visualization data.

In some embodiments, a method for processing relational database data using a generative artificial intelligence (AI) language model is provided, the method performed by a system comprising memory and one or more processors, the method comprising: receiving relational database data; generating, based on the relational database data, schema data in text string format; receiving a user query input; generating and providing a first prompt to a generative AI language model, wherein the first prompt is generated based on the user query input and based on the schema data; receiving, from the generative AI language model, in response to the first prompt, an indication of a first subset of the database data that is identified as relevant to the user query; generating and providing a second prompt to the generative AI language model, wherein the second prompt is generated based on the user query input and based on the identified first subset of the database data; and receiving, from the generative AI language model, in response to the second prompt, an output comprising insight data generated based on the user query input and based on the identified first subset of the database data.

In some embodiments, a non-transitory computer readable storage medium storing instructions for processing relational database data using a generative artificial intelligence (AI) language model is provided, wherein the instructions, when executed by one or more processors of an electronic device, cause the device to: receive relational database data; generate, based on the relational database data, schema data in text string format; receive a user query input; generate and provide a first prompt to a generative AI language model, wherein the first prompt is generated based on the user query input and based on the schema data; receive, from the generative AI language model, in response to the first prompt, an indication of a first subset of the database data that is identified as relevant to the user query; generate and provide a second prompt to the generative AI language model, wherein the second prompt is generated based on the user query input and based on the identified first subset of the database data; and receive, from the generative AI language model, in response to the second prompt, an output comprising insight data generated based on the user query input and based on the identified first subset of the database data.

All or part of any one or more of the embodiments described above may be combined in whole or in part with one another and/or with any other embodiment, feature, or aspect described herein.

BRIEF DESCRIPTION OF THE FIGURES

The following figures show various systems and methods for relational database insight extraction and visualization. The systems and methods shown in the figures may have any one or more of the characteristics described herein.

FIG. 4 depicts a correlation matrix for locating additional relevant data, according to some embodiments.

DETAILED DESCRIPTION

Analyzing relational databases to generate insights can be difficult without advanced statistical and database language knowledge that many users lack. Furthermore, these analyses can be rigid, providing a narrow answer to a particular question without consideration of what insights may be contained in the database as a whole. Incorporation of generative AI language models with relational database analysis can be impractical given present-day prompt token limitations, which may exceed the size of the dataset submitted for analysis.

Accordingly, described herein are systems and methods for extracting and visualizing insights from relational databases using natural language queries and generative AI. By using generative AI and a natural language input, the systems and methods reduce the technical barrier to entry, allowing users unversed in database language to derive insights from large datasets. By using dynamic prompting, the systems and methods expand the user's query to add relevant phrases and data analysis terms that may have been absent from the query, thereby increasing the quality of the match between the database and the user's query and producing the most relevant insights and visualizations. By systematically checking for correlations within datasets, the systems and methods increase the breadth of the analysis by including correlated terms the user may not have known to include in their query. Finally, by using data aggregation and reduction functions, the systems and methods can reduce data size without losing coarse-level information and trends. This allows the presentation of data to generative AI models without exceeding prompt token limits, and thus the harnessing of generative AI to find patterns, correlations, and insights that would be otherwise inaccessible to the average user. Including visualizations provides an increased perspective on the generated textual insights and improves user understanding of complex datasets.

Figure 1A:
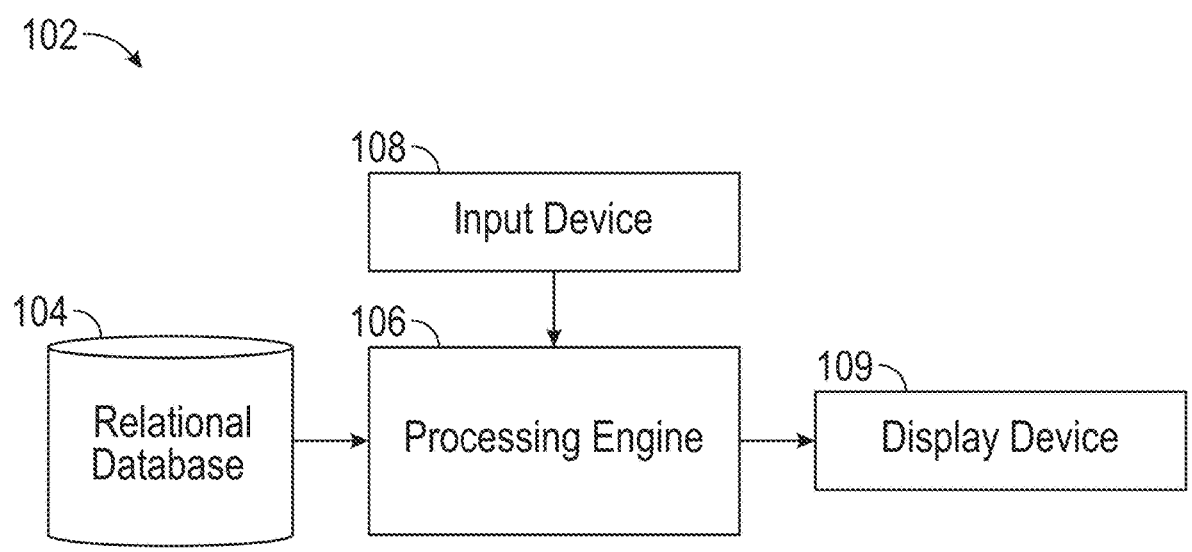
FIG. 1A depicts an exemplary system 102 for using generative AI language models to generate insights and visualizations.

FIG. 1A depicts an exemplary system 102 for using generative AI language models to generate insights and visualizations. As shown, system 102 may include relational database 104, processing engine 106, input device 108, and display device 109. Processing engine 106 may be communicatively coupled to the other components of system 102 by any wired and/or wireless network communication protocol(s). Processing engine 106 may include one or more processors locally, remotely, and/or arranged in a distributed processing architecture. Processing engine 106 may be configured to execute code configured to cause system 102 to perform any one or more of the methods (or portions thereof) described herein. As shown in FIG. 1A and described in further detail herein, processing engine 106 may be configured to receive relational database data from relational database 104, to receive one or more user inputs (e.g., natural language inputs) from input device 108, and to transmit one or more outputs (e.g., textual insights and/or visualizations) to display device 109. (While input device 108 and display device 109 are shown separately for illustrative purposes, they may be provided as part of the same device.) The data processing operations performed by processing engine 106 may include any one or more of the techniques described herein, including data preprocessing, schema data generation, correlation matrix generation, column identification, data filtering, concise data generation, application of one or more generative AI language models, textual insight generation, and/or visualization generation. Different data processing operations performed by processing engine 106 may be performed by the same set of one or more processors and/or by different sets (e.g., processing modules) of one or more processors.

Figure 1B:
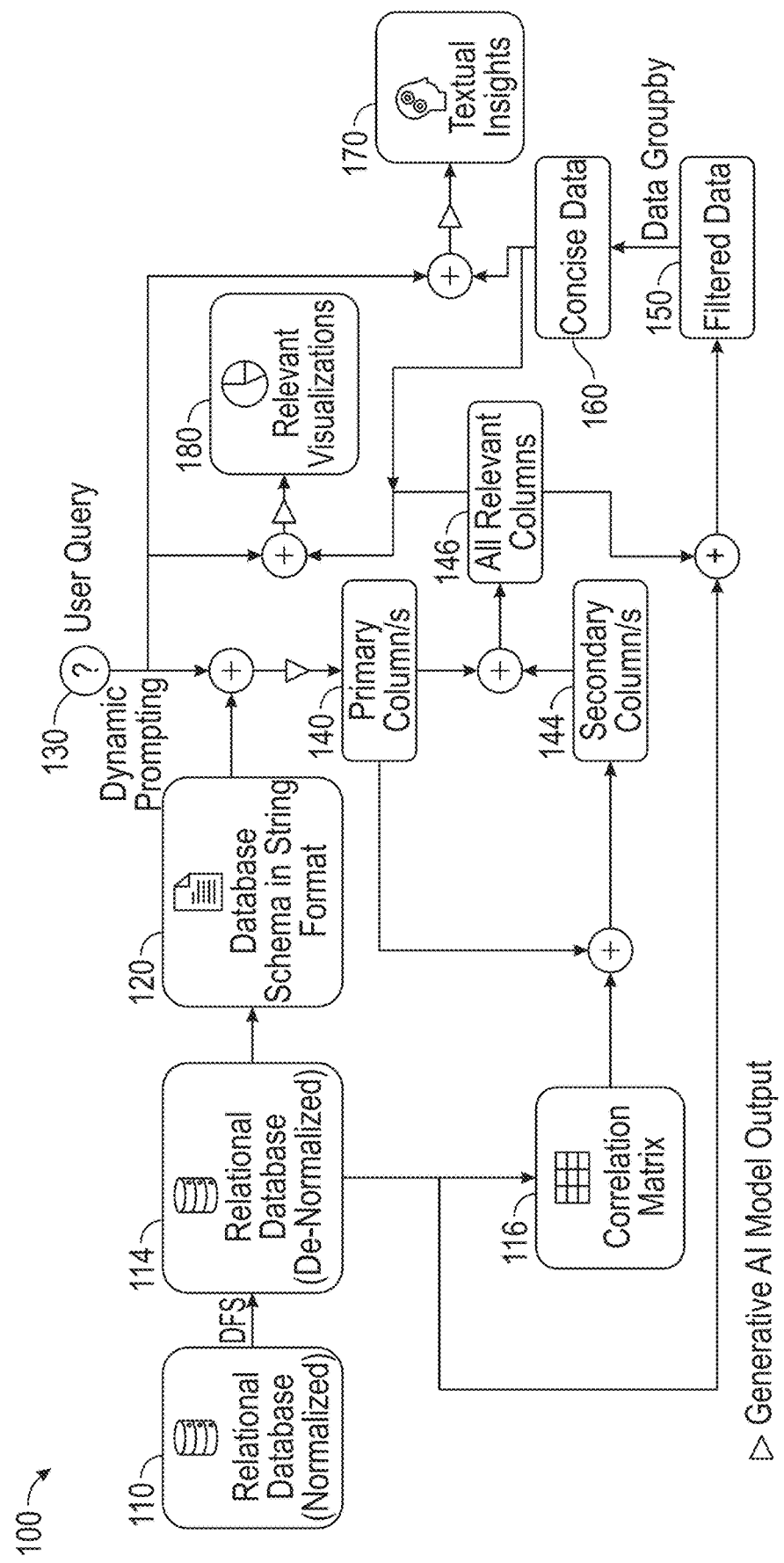
FIG. 1B depicts a process for relational database insight extraction and visualization, according to some embodiments.

FIG. 1B depicts an exemplary process 100 for using a system comprising one or more processors and memory to extract insight data 170 and/or visualizations 180 from a relational database, including for example any database using SQL to organize data. Process 100 may be executed, in some embodiments, by any suitable processor-based system, including system 102.

As shown in FIG. 1B, data from a relational database 110 (e.g., relational database 104) containing one or more tables in a normalized format may be converted (e.g., by processing engine 106) to a denormalized format to integrate and consolidate table data, optionally using a Depth First Search (DFS) algorithm, resulting in denormalized database 114 with one or more tables in denormalized format 114.

Denormalized database 114 may then be used to produce (e.g., via one or more data processing operations performed by processing engine 106) one or more correlational matrices 116. Correlational matrices 116 may be produced by calculating a correlation coefficient between each column and the one or more other columns that form the one or more tables within denormalized database 114. Correlation coefficient calculation may vary depending on the data type contained within each column, optionally employing Chi-Square, Pearson correlation, and/or analysis of variance techniques. Correlational matrix 116 may be stored locally or remotely for further use in the insight generation pipeline as described below.

In addition to forming an input for creation of one or more correlational matrices, information from denormalized database 114 may also be used to create schema 120, which may comprise schema data in string format. This database schema 120 optionally includes the name of each table and/or column in the relevant dataset, the type of data contained in each column, the uniqueness of values in each column or number of unique values, and/or a description of values contained within each table and/or column. This schema information may then be used as an input to the generative AI language model to assist in locating the portion of the denormalized database relevant to the user query.

When a user enters a data query 130 into the system (e.g., via input device 108) using natural language, for example "What caused quarterly sales to increase?", a generative AI language model (such as GPT-4, Lama AI, Gemini, or the like) may be used to determine which portion of the denormalized database is most relevant to the user query.

Dynamic prompting may be applied to the user query 130 before sending the query and database schema information to the generative AI model. For example, if a user enters "What caused quarterly sales to increase?" dynamic prompting may be applied ensure the prompt sent to the generative AI model additionally includes the phrase revenue to ensure that the most relevant portion of the denormalized database is located by the program. A prompt generated by the system and provided to the generative AI model may include the user's input, additional information (e.g., contextual information) generated based on the user's input, and information taken from or generated based on the database schema data. In this way, the generative AI model may identify relevant portions of the underlying database data for responding to the user's query based on the model's analysis of the user's query and of the database schema data.

The most-relevant portion of the denormalized database, identified by the AI-language model by processing the user's input and the database schema data, may take the form of one or more columns located within one or more tables contained in the database. In such a case, the relevant portion of the database may be referred to as "primary columns," labeled 140 in FIG. 1B. The identified portions may include a single column (e.g, a column determined to have the highest relevance) or a plurality of columns (e.g., all columns meeting one or more criteria for primary relevance. For example, with a user prompt 130 of "What caused quarterly sales to increase?" and a database schema in string format 120 containing a column name of "Revenue," the generative AI model may select the Revenue column as the primary column.

If one or more primary columns 140 have been identified, these columns may be used in combination with one or more correlational matrices 116 (e.g., as described earlier) to identify additional relevant portions of the denormalized database 114. For example, if a primary column has been identified, other columns found to be correlated to the primary column may be identified as additional relevant portions of the denormalized database, and may be referred to as secondary columns 144. Other columns may be selected, for example, based on whether a correlation score (as indicated in correlation matrix 116) exceeds a predefined or dynamically determined threshold. Other columns may be selected by selecting a predefined or dynamically determined number of highest-matching columns. When secondary columns are selected, the primary and secondary columns collectively form a subset of the denormalized database 146 that is relevant to the user query.

Corresponding data content (e.g., data values) may then be extracted from the denormalized database 114 for the identified relevant portions. For example, for all identified primary and secondary columns, all data values included in all rows of those identified columns may then be extracted from denormalized database 114. This extracted portion of the denormalized database data may then be used, as explained below, to generate insights and/or visualizations based on the user query.

Due to token limits of generative AI language models, it may be impractical and/or impossible to process the entire extracted portion of the denormalized database data using the generative AI language model. Thus, the extracted portion may be further processed to enable its use as part of a prompt to a generative AI language model. AI model To ensure usability within token limitations of generative AI language models, process 100 may involve a filtration step (or other data processing operation) to eliminate data that is unusable or less relevant in producing an answer to the user query, producing filtered data 150. This filtration step may comprise detecting and eliminating from the relevant subset 146 data that is categorical or textual and contains a high degree of cardinality, e.g. it has many unique values, for example user identification values or other data not directly relevant when a query is quantitative in nature.

Following production of filtered data 150, further aggregation and/or reduction may occur without losing insight into trends or other key information necessary to address the user prompt, employing for example the GroupBy function in Python. To accomplish this aggregation, generative AI may be used to select one or more relevant data reduction functions based on attributes of each numerical column. For example, the generative AI model could select the mean function, or the min or max function to aggregate numerically similar data. Next, secondary columns may be sorted in ascending order based on the number of unique values each contains (its cardinality), before optionally being grouped into "chunks" along with the one or more primary columns using a sliding-window technique and the chosen data reduction function being applied along with grouping to the row data within one or more columns in the chunk, for example replacing a portion of row data with the portion's mean value. After reducing their size, each chunk may then be stored in a list before being converted into string format and thereby forming the concise data output 160. This concise data in string format then may be provided as part of a prompt to the generative AI model to produce insights 170 responsive to the user query.

Concise data 160 may also be used to generate visualizations 180 relevant to the user query (although this relationship is not explicitly shown in FIG. 1B). Information from the production of filtered data 150 and concise data 160, including for example the name of each table and/or column in the relevant dataset, the type of data contained in each column, the uniqueness of values in each column or number of unique values, and/or a description of values contained within each table and/or column, may be combined with concise data 160 and/or with data from the user prompt before being used as an input for the generative AI model.

The generative AI model may produce a set of data necessary to produce the one or more visualizations or may produce the visualizations themselves, for example a line graph, scatter plot, bar chart, and/or pie chart, that are relevant to the user prompt. For example, if the user prompt is "What caused quarterly sales to increase?", the program may decide to create several line graphs using columns titled "Revenue," "Sales Associate Positions," and "New Product Releases" as the Y-axis of each plot and time over the past quarter as the X-axis. To produce the one or more visualizations, the generative AI model may alternatively or additionally instruct a visualization engine such as Plotly library in Python to produce the plot based on data output by the generative AI and/or to produce the plot based on the relevant portion of the dataset 146 that was used as an input to produce filtered data 150 and concise data 160 (and/or based on a larger portion of denormalized database 114 that may be extracted therefrom by a visualization engine that is instructed by the generative AI language model).

Figure 2:
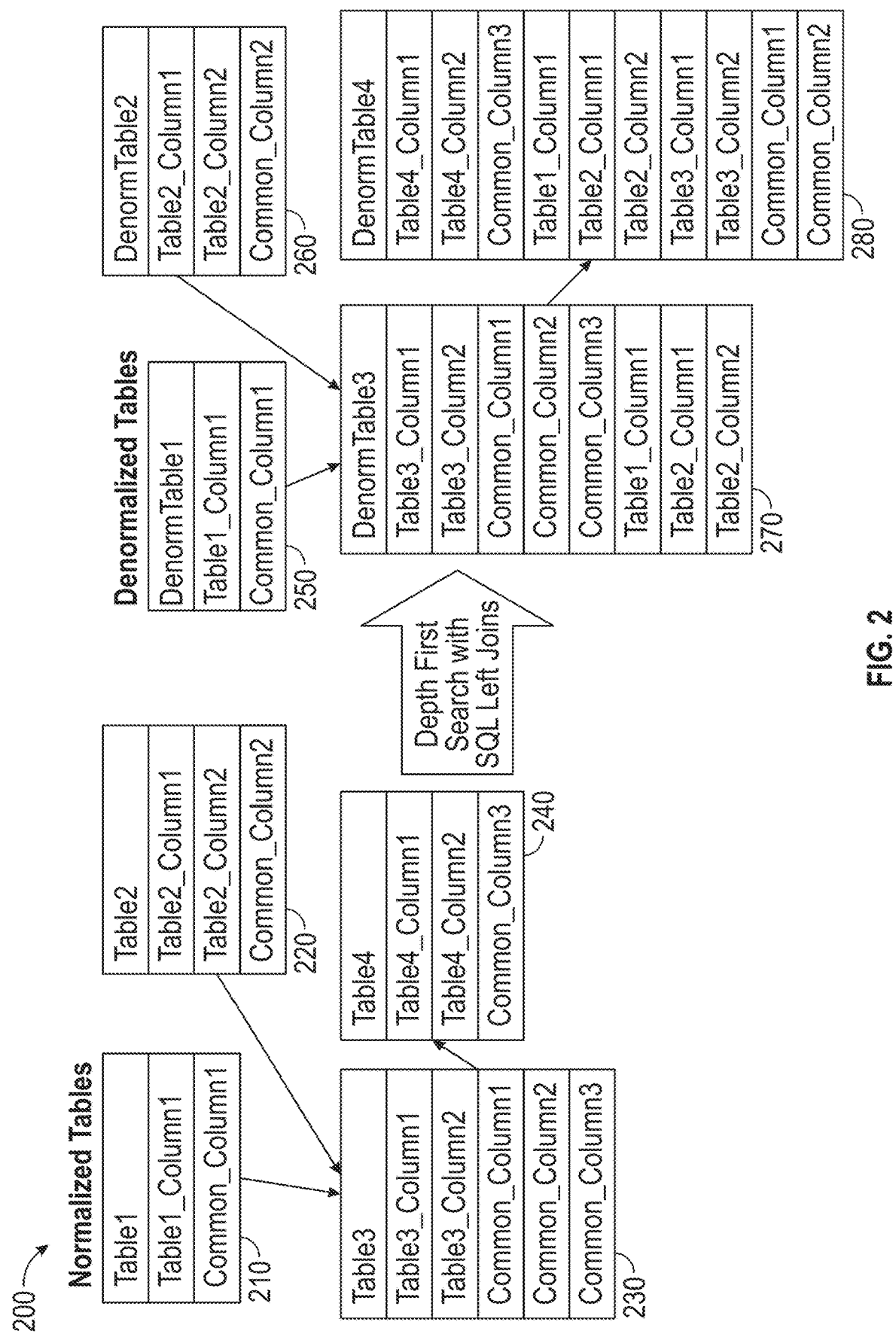
FIG. 2 depicts the conversion of denormalized tables into normalized tables, according to some embodiments.

FIG. 2 depicts conversion 200 of a set of tables in normalized format (e.g. table 210) within normalized database 110 to a set of tables in denormalized format (e.g. table 250) within denormalized database 114, thereby integrating and consolidating table data for further processing. In one exemplary embodiment, this denormalization process can include three steps: (1) finding connected columns, (2) storing table relationships in an adjacency matrix, and (3) constructing the final denormalized table. In step (1), similarities between data in each column may be measured to create one-to-many and/or many-to-many relationships. For column names, similarities may be measured using Levenshtein distance between two strings representing the name of each column, and this distance may be subjected to a user-defined threshold to determine whether a column is "connected". For column content (e.g., row data), similarities between sets of values may be measured using Jaccard index with this index also optionally subjected to a user-defined threshold to determine connection.

In step (2), relationships measured in step (1) may be stored as an adjacency matrix, wherein the nodes of the graph represented by the adjacency matrix are names of tables contained in the normalized database, with pairs of connected column names forming the edges. The matrix may include an edge direction which may indicate the column in the connected column pair with the highest number of unique values.

In step (3), a Depth-First Search (DFS) algorithm may be deployed to traverse the nodes and edges of the graph represented by the adjacency matrix. The order used by the DFS algorithm may be the order that is subsequently used to merge tables based on a connected column using, for example, an SQL LEFT JOIN operation. By merging tables sharing a connected column, denormalized tables may be formed while retaining all information. For example, normalized tables 210, 220, and 230 share connected columns Common_Column 1, Common_Column 2, and Common_Column 3, as shown in FIG. 2. By merging all three tables based on these connected columns, denormalized table 270 is formed and contains all information present in tables 210, 220, and 230. Furthermore, denormalized tables may be created in a recursive manner, ensuring the total number of tables before the denormalization process is the same as the total number after, and ensuring that each merged table contains the information of all tables which were merged to form the merged table. For example, in FIG.

2, there are four tables in the normalized state and four tables in the denormalized state following the denormalization process. Furthermore, table 270 contains all information present in merged tables 250 and 260, and table 280 contains all information present in merged tables 250, 260, and 270.

Figure 3:
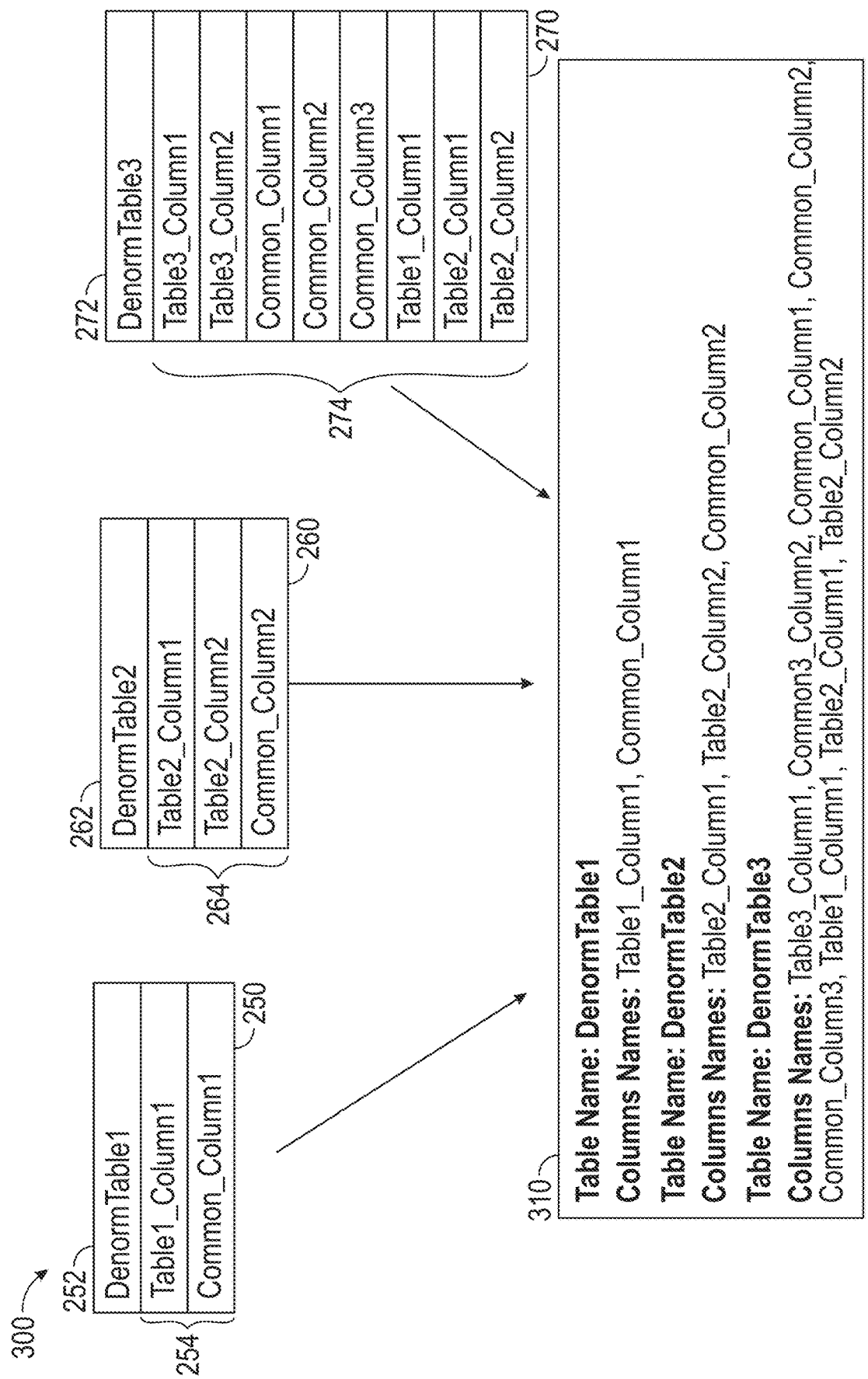
FIG. 3 depicts the conversion of information in denormalized tables into string format, according to some embodiments.

FIG. 3 depicts an extraction process 300 for reading information in one or more denormalized tables, e.g. table 250, contained within denormalized database 114 and converting it to string format to use as an input to a generative AI language model. Information extracted from the one or more denormalized tables can be referred to as database schema and may include information such as the name of each table and/or column in the relevant dataset, the type of data contained in each column, the uniqueness of values in each column or number of unique values, and/or a description of values contained within each table and/or column. For example, as shown in FIG. 2, table 260 contains table name 262 or "DenormTable2" and column names 264 including "Table2_Column1," "Table2_Column2," and "Common_Column2." Table name 262 and column names 264 are extracted and converted to string format to form the database schema in string format 310 as shown in FIG. 2.

By converting database schema to string format, the schema may be more readily input into a generative AI model to determine the portion of the denormalized database most relevant to the user prompt. As discussed within the context of FIG. 1B, to make such a determination, user query 130 may be generalized using a dynamic prompting process to aid in finding a match between the user query 130 and database schema 120. Such a match may then be the basis for a determination that one or more columns in denormalized database 114 are considered "primary columns" 140 and of importance with respect to the user query.

Once one or more primary columns relevant to the user query have been located, the system may search for additional relevant data to enable a more comprehensive analysis. This additional data may be correlated to the one or more primary columns and/or may have dependencies which make inclusion of this data necessary to the formation of a complete answer to the user query. To search for additional relevant data, one or more correlational matrices may be created for each of one or more denormalized tables located within the denormalized database. As shown in FIG. 4, the system may form a correlational matrix 400 with diagonal symmetry by computing a coefficient of correlation for each data column with respect to every other data column within a given denormalized table. Thus, both the columns and rows of the correlational matrix are formed using the column names of the denormalized table for which the correlational matrix is being built. In the example displayed in FIG. 4, the columns and rows are formed by column names 274 of denormalized table 270, labeled with table name 272 (DenormTable3).

To accommodate different types of data within the columns of the one or more denormalized tables, the system may use different techniques for calculating correlation coefficient. For example, if a correlation coefficient between two columns both containing categorical or textual data is being calculated, a Chi-Square test may be employed. Alternatively, if the two columns both contain numerical values, a Pearson correlation coefficient may be calculated. If one column is categorical and the other numerical, an analysis of variance technique may be used. To ensure comparability between different methods, each resulting coefficient of correlation may be scaled to a value between 0 and 1 as shown in FIG. 4.

Once a scaled coefficient of correlation has been calculated for each denormalized table column with respect to every other denormalized data column, thereby forming a correlational matrix, the system may use the matrix to locate other columns from a particular denormalized table that are sufficiently correlated to the one or more primary columns. To accomplish this, the system may place a user-defined threshold value on scaled coefficients of correlation, above which a column pair is considered correlated and by placing an upper limit on the number of columns considered correlated to a particular primary column. For example, in correlational matrix 400 of FIG. 4, if table column name Common_Column1 were found by the generative AI model to be relevant to the user query and thus be considered one of the primary columns, the scaled coefficient of correlation values associated with Common_Column1 would then be analyzed to determine how many if any exceed the threshold value indicating correlation. Assuming the threshold value was set to 0.85 and the upper limit on number of correlated columns set to 2, Table3_Column1 with a coefficient of correlation of 0.87, Table1_Column1 with 0.99, and Table2_Column1 with 0.88 would each be found to exceed the threshold value of 0.85, however with the upper limit on number of correlated columns set to 2, only the two columns with the highest coefficients of correlation, or Table3_Column1 and Table1_Column1 would be considered to be correlated and thus relevant in addition to the particular primary column to the user query. In FIG. 1B, these additionally relevant columns are referred to collectively as "secondary columns" 144 and all primary columns 140 combine with all secondary columns 144 to form all columns relevant to the user query 146. In one or more examples, all relevant columns 146 may serve as the basis for the production of insight data 170 and visualizations 180.

Given limitations on the number of prompt tokens generative AI language models can accept, typically on the order of thousands of tokens, the large amounts of quantitative data that the system may process, possibly exceeding millions of rows, may be summarized via aggregation and/or reduction to a more compact form before forming the basis for a generative AI prompt. In the process of aggregating the data, it is important that coarse-level information, insights, trends, etc. not be lost to ensure the data that remains can form the basis of as detailed and accurate a response to the user query as possible.

To accomplish this summarization of the relevant dataset thereby reducing its size, the system may take several steps. First, the data cardinality for each column, or the degree to which each as a whole column contains unique values, may be measured. If columns are present in the dataset of all relevant columns that include categorial or textual values and the column as a whole has high data cardinality, e.g. it contains user identification values or other data not directly relevant when a query is quantitative in nature, the column may be removed from the set of relevant columns as it is unlikely to assist in producing insights and quantitative trends relevant to the user query while its inclusion in the prompt would consume a portion of the limited number of tokens. By completing this removal step, the system forms filtered data 150 as shown in FIG. 1B.

Second, the database schema in string format 120 already used as an input by generative AI to determine the one or more primary columns may be used in combination with the computed cardinality by the generative AI model to determine the most relevant type or types of aggregating functions to apply to the numerical columns that now form the relevant dataset. Based on database schema including, for example, the name of each table and/or column in the relevant dataset, the type of data contained in each column, the uniqueness of values in each column or number of unique values, and/or a description of values contained within each table and/or column, the generative AI model recommends the most relevant aggregation function. For example, if a numerical column is associated with the table name "Citizen Age" and has a table name "Ages of U.S. Citizens", and if the numerical column has a relatively low degree of cardinality, a generative AI model may recommend that a mean function be used to aggregate and thus reduce in size the data contained within the column.

Figure 5:
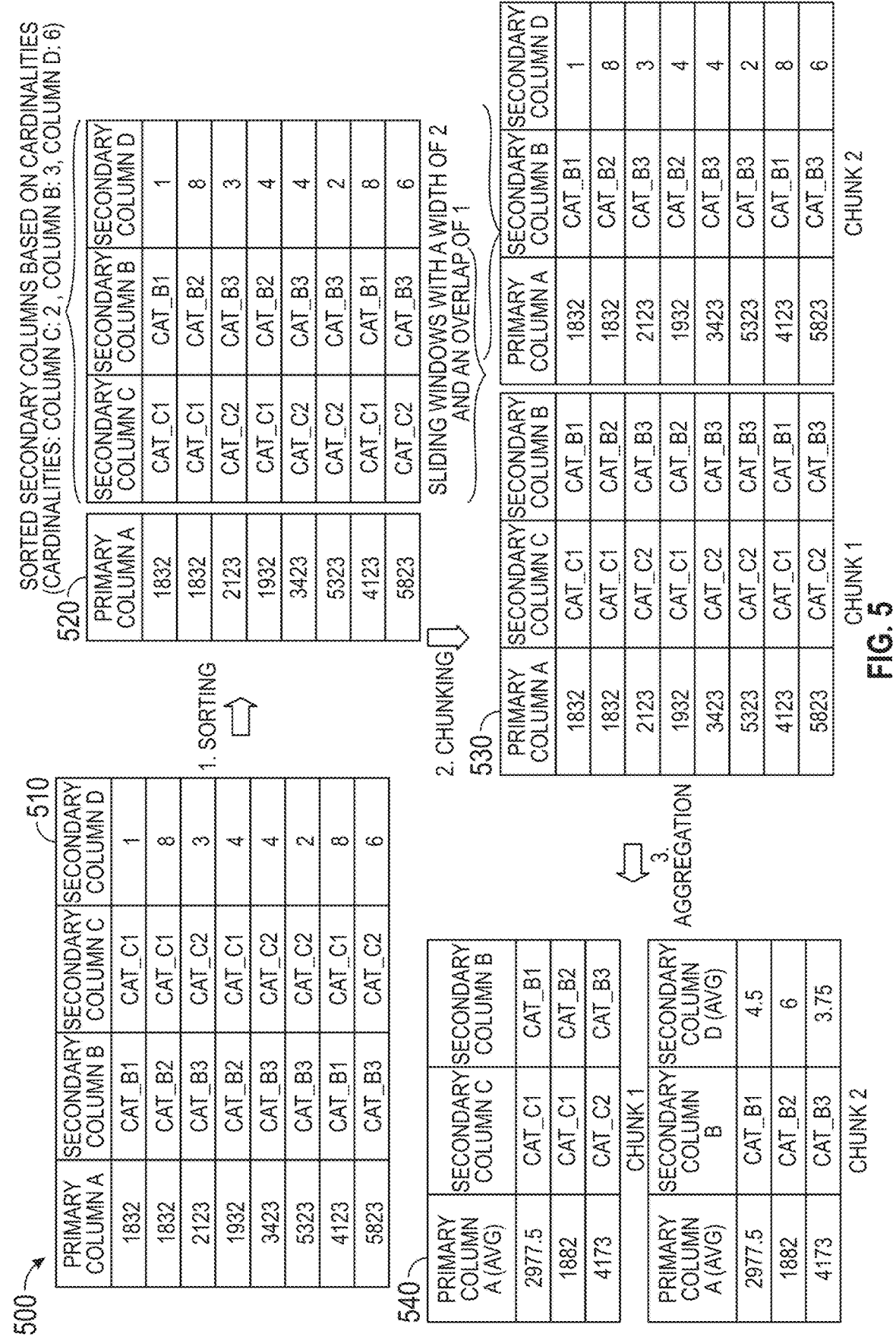
FIG. 5 depicts the use of chunking and data aggregation to reduce data size, according to some embodiments.

Third, to ensure efficient aggregation, secondary columns may next be sorted in ascending order based on the number of unique values each contains (its cardinality). For example, in FIG. 5, denormalized table at step 510 contains three secondary columns, with Secondary Column B having a cardinality of three (Cat_B1, Cat_B2, and Cat_B3), Secondary Column C having a cardinality of two (Cat_C1 and Cat_C2), and Secondary Column D having a cardinality of six (1, 8, 3, 4, 2, and 6). Denormalized table at step 520 thus shows the arrangement of the secondary columns following the sorting process with the secondary column with the lowest cardinality (Secondary Column C) in the leftmost position and the secondary column with the highest cardinality (Secondary Column D) in the rightmost. Next, the sorted secondary columns may be divided into "chunks" or groupings through use of a sliding window with user-defined (and/or algorithmically and/or dynamically defined) variables controlling window width and/or overlap to ensure coherent data aggregation. The one or more primary columns are then appended to each chunk. For example, in FIG. 5, a sliding window with a width dimension of two columns and an overlap dimension of one column results in the formation of chunks that are two columns wide and that overlap one another by one column. Thus, Chunk 1 as shown at step 530 contains Primary Column A, Secondary Column C, and Secondary Column B, and Chunk 2 contains Primary Column A, Secondary Column B, and Secondary Column D. Once each chunk has been formed, the system may apply the data aggregation or reduction function chosen to the row data within one or more numerical columns and may group the row values within one or more categorical or textual columns of each chunk, and in so doing may significantly reduce the number of rows or the total data size of each column. For example, as shown at step 540, a mean or average function is applied to Primary Column A of Chunk 1, and Secondary Column C and Secondary Column B are grouped accordingly, reducing the number of rows in the chunk from eight to three. Such data aggregation and grouping operations may utilize, for example, the GroupBy function in Python. By employing overlapped chunking to a presorted dataset, the system improves the fidelity of the data aggregation operation and reduces the number of tokens required for generative AI processing while minimizing the loss of detail, thereby ensuring an accurate response to the user query is still possible.

Figure 6:
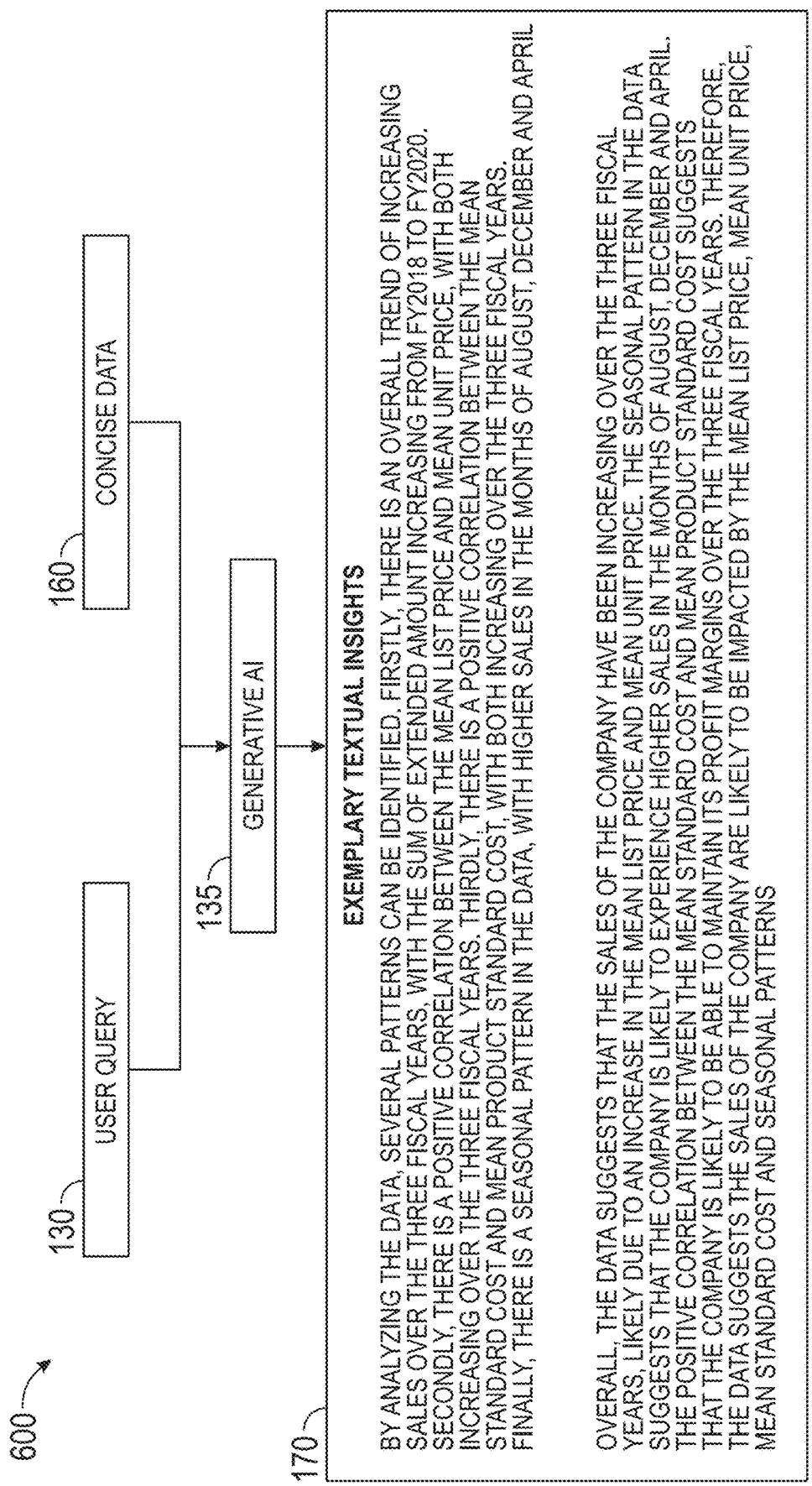
FIG. 6 depicts a process for generating textual insights, according to some embodiments.

Fourth, to build concise data 160, the system may begin with an empty list, generated for example using Python, and will add values for each chunk that reflect the output of the aggregation function for each chunk as described above. This list may initially be stored in a compact format such as JSON. Addition of chunk values to the concise data list may occur iteratively until a user-defined prompt token limit is reached. Finally, the concise data list may be converted to string format for use with the user query 130 as an input to the generative AI model as shown in FIG. 6. As with generation of primary column information from database schema, the user prompt may be broadened via a dynamic prompting process to ensure the best possible match between the insight the user is seeking and information contained within the dataset. For example, if a user enters "What caused quarterly sales to increase?" dynamic prompting may ensure the prompt sent to the generative AI model additionally includes the phrases revenue, trends, correlations, outliers, clusters, and patterns to ensure that the most relevant portion of the denormalized database is located by the program.

Once the concise data prompt along with the user prompt, expanded via dynamic prompting, has been provided to the generative AI model, the program may systematically search the data for patterns, correlations, and specific takeaways that are responsive to the user query, a process that may result in the production of one or more textual insights 170. As shown in FIG. 6, insights 170 may include a summarization of data correlated to the variable contained within the user query as well as detail on any trends in the data over time. For example, as shown in FIG. 6, in response to a user query related to increasing sales, the generative AI language model produces insights which indicate mean list price and mean unit price have increased over the same period, and that sales are highest during particular months, giving the user insight into the cause of increasing sales and their possible annual distribution in the future.

Figure 7:
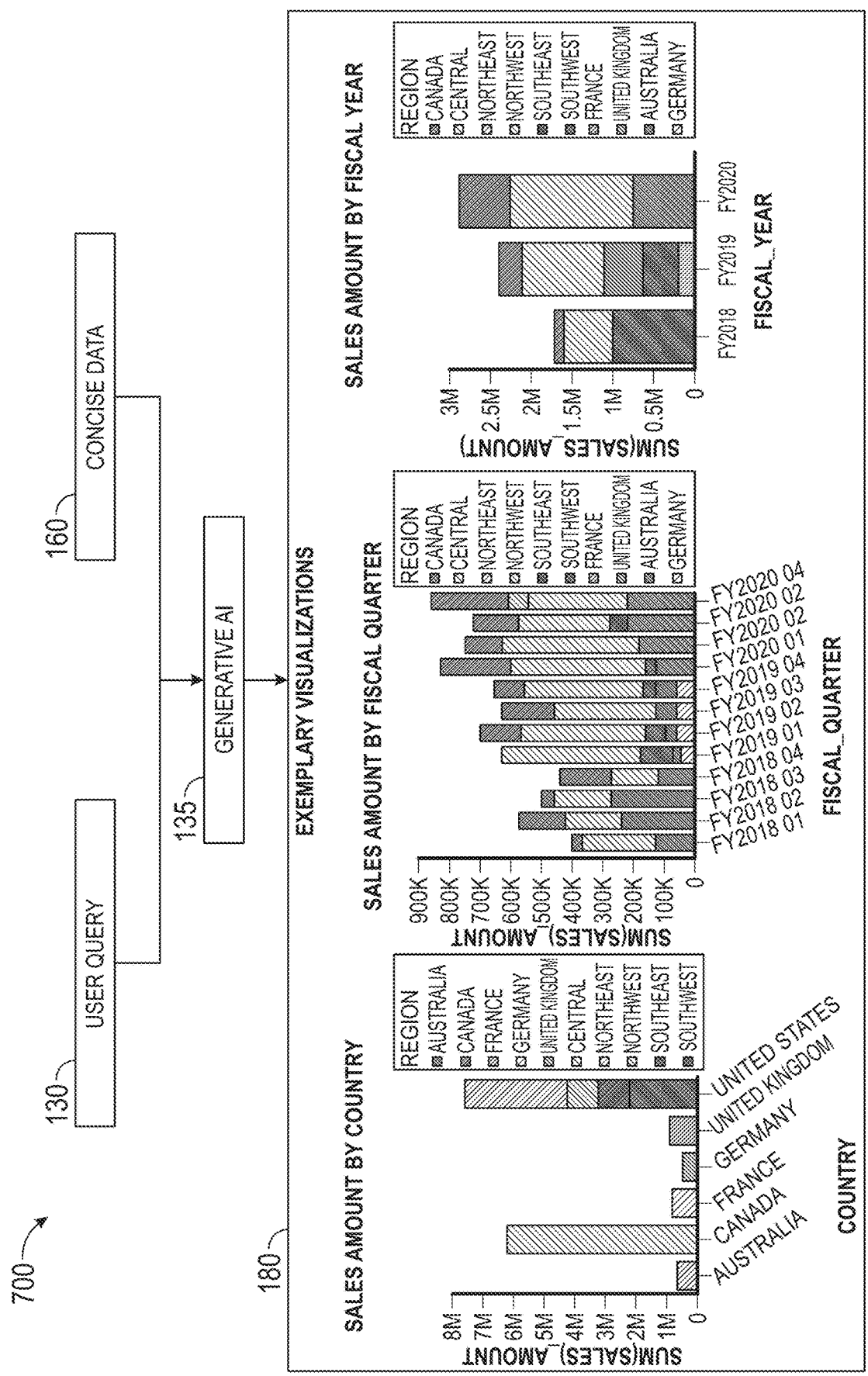
FIG. 7 depicts a process for generating visualizations, according to some embodiments.

To accompany the generated insights, the system may also produce separate visualizations that capture in a different manner the information conveyed in the insights. These visualizations may include, for example, line graphs, scatter plots, bar charts, and/or pie charts. Information from the production of filtered data 150 and concise data 160, optionally including the name of each column in the relevant dataset, the type of data contained in each column (e.g. whether it is textual or numerical), and/or the data cardinality of each column (uniqueness of values in the column) or number of unique values, and a description of values contained within the column, may be combined with the concise data itself and with the user query to again form a prompt to the generative AI model as shown in FIG. 7. To conserve prompt tokens, the dataset information may be passed to the generative AI model in tabular form. To aid visualization generation, dynamic prompting may expand the user prompt not only to a broader form of the query but to include requests for data necessary to produce visualizations along with a set of the most relevant visualizations. For example, if a user enters "What caused quarterly sales to increase?" dynamic prompting may expand the prompt to include not only phrases such as revenue, trends, correlations, outliers, clusters, and patterns but also requests for the plot types and plot data that are most relevant to the user query.

Upon providing as a prompt dataset information, concise data, and the user query expanded using dynamic prompting, the generative AI model may return a set of visualization data including chart types, X-axis data, Y-axis data, and/or legend data to create one or more charts visualizing insights produced by the system. By including as a prompt dataset information from the production of filtered data and concise data, the generative AI model can more intelligently determine the one or more chart types most relevant to the user query. This set of data may then be plotted by the generative AI model itself, and/or the model may instruct a visualization engine, for example the Plotly graphing library in Python, to produce the plot based on data output by the generative AI model and/or to produce the plot by referencing the full relevant dataset 146. For example, as shown in FIG. 7, in response to a query related to increasing sales, the generative AI model selected three bar charts, plotting sales amount as a function of country, fiscal quarter, and fiscal year, with each bar containing information about the location of the sales. By including such charts, and visualizations more generally, the system may provide additional perspective on the user query and convey insights that would be difficult produce using text alone. To ensure a seamless experience, these visualizations may accompany the textual insights to be delivered as part of a single user-friendly interface. For example, the visualizations could be displayed adjacent to the textual insights or as part of a slideshow-style viewer allowing the viewer to toggle quickly between textual insights and visualizations.

Figure 8:
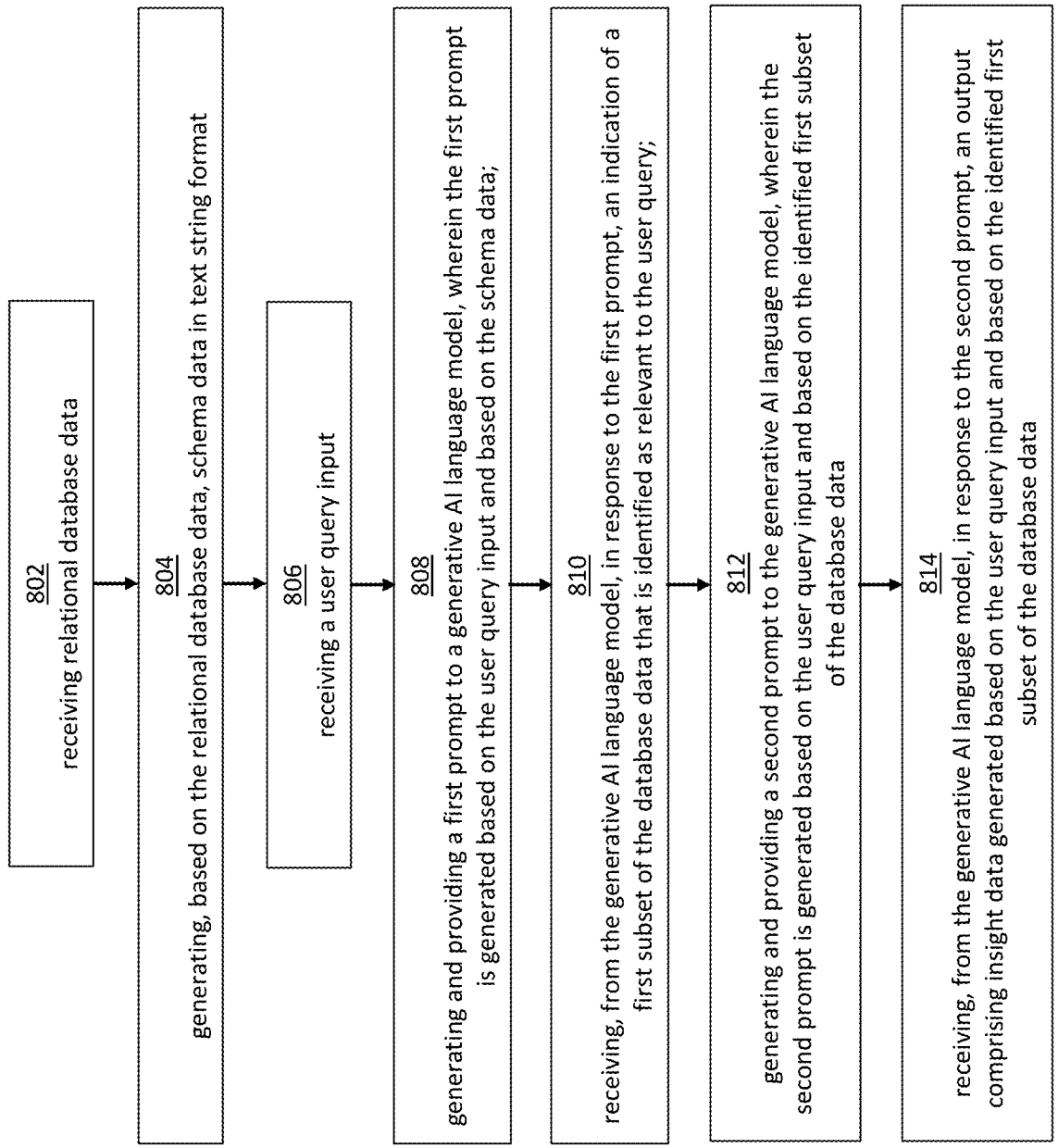
FIG. 8 depicts a process for relational database insight extraction and visualization, according to some embodiments.

FIG. 8 depicts an exemplary process employing a system for processing relational database data using a generative artificial intelligence (AI) language models and comprising one or more processors and memory that store instructions. When those instructions are executed by the one or more processors, they may cause the system to first receive relational database data, as shown at block 802. Next, the system may generate, based on the relational database data, schema data in text string format, as shown at block 804. Next, the system may receive a user query input, as shown at block 806. Next, the system may generate and provide a first prompt to a generative AI language model, wherein the first prompt is generated based on the user query input and based on the schema data, as shown at block 808. Next, the system may receive, from the generative AI language model, in response to the first prompt, an indication of a first subset of the database data that is identified as relevant to the user query, as shown at block 810. Next, the system may generate and provide a second prompt to the generative AI language model, wherein the second prompt is generated based on the user query input and based on the identified first subset of the database data, as shown at block 812. Next, the system may receive, from the generative AI language model, in response to the second prompt, an output comprising insight data generated based on the user query input and based on the identified first subset of the database data, as shown at block 814.

In some embodiments, output data (e.g., including textual insight data and/or visualization data) may be stored locally, automatically transmitted by one or more network communication protocols to another system, automatically applied in one or more downstream data processing operations, automatically used to generate one or more additional outputs, and/or automatically applied to trigger one or more automated system functionalities (such as, e.g., automatically activating a system component; automatically deactivating a system component; automatically changing a system component mode of operation; and/or automatically instantiating, deactivating, or configuring a communicative link between two or more users and/or two or more system components).

In some embodiments, any of the techniques described herein may (in whole or in part) be automatically triggered by detecting one or more conditions, such as operation of a system component, operation of a system component in a predefined mode, activation of a system component, deactivation of a system component, network communication between predefined users/components/nodes, predefined network communication content, predefined network communication volume, user login, data upload, a database being updated, and/or a data scraping operation being instantiated or completed.

In some embodiments, any of the techniques described herein may be applied as part of a recursive and/or iterative feedback loop. For example, any one or more of the generative AI language models described herein may be iteratively trained, including by being retrained using output data (e.g., textual insight data and/or visualizations) generated by the systems described herein. Additionally or alternatively, any one or more other programmatic processes described herein-including denormalization of data, generation of schema data, identification of primary columns, identification of secondary columns, generation of correlation matrices, extraction of database content (e.g., row data), sorting, chunking, generation of concise and/or filtered data, generation of prompt data for an AI language model, and/or any other data processing operation described herein—may be iteratively performed using one or more feedback loops, including by being retrained using output data (e.g., textual insight data and/or visualizations) generated by the systems described herein, using an adversarial training process, and/or using assessment/feedback data provided by users to rate a performance of the processes.

Figure 9:
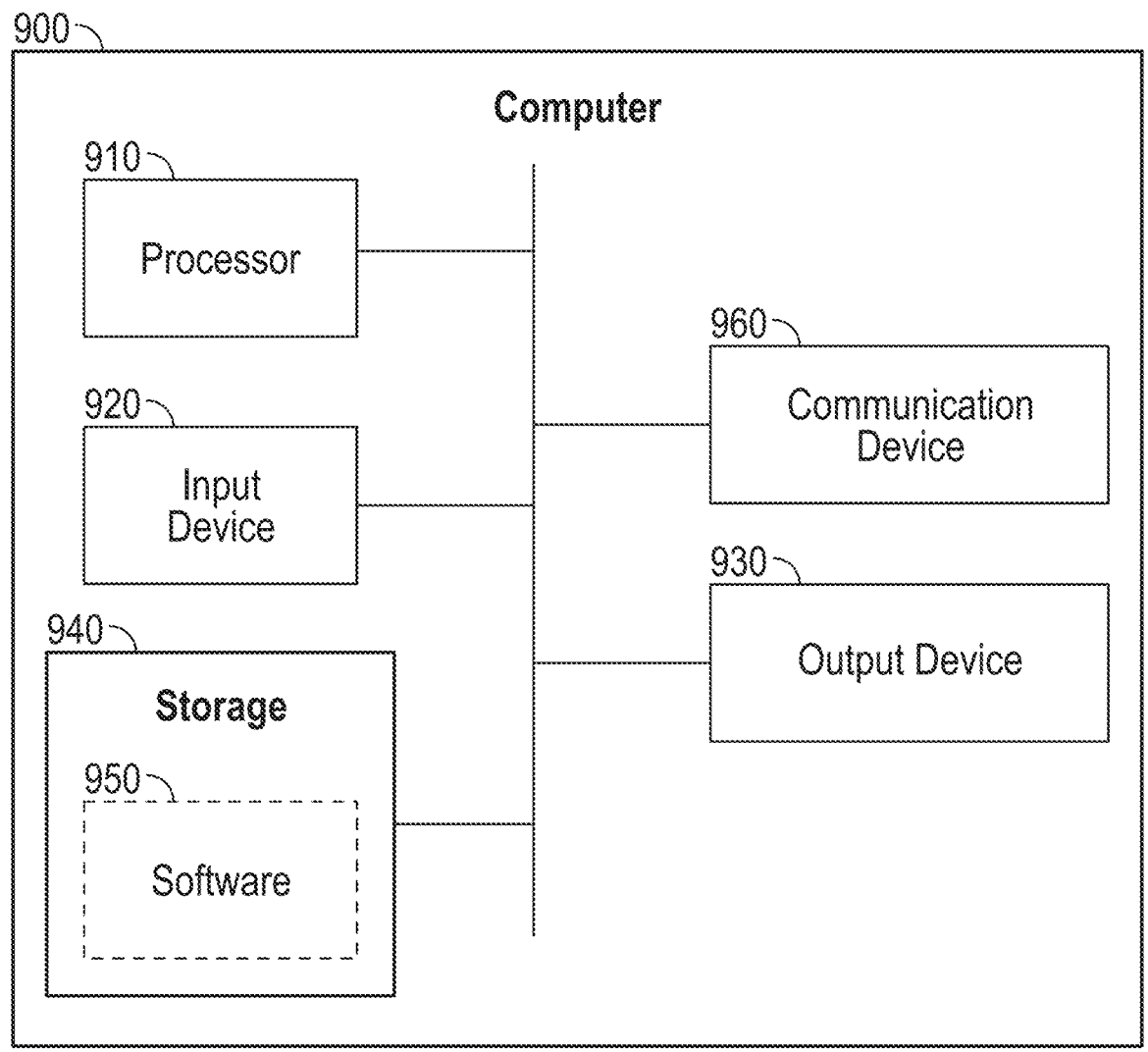
FIG. 9 depicts a computer system, according to some embodiments

In one or more examples, the disclosed systems and methods utilize or may include a computer system. FIG. 9 illustrates an exemplary computing system according to one or more examples of the disclosure. Computer 900 can be a host computer connected to a network. Computer 900 can be a client computer or a server. As shown in FIG. 9, computer 900 can be any suitable type of microprocessor-based device, such as a personal computer, workstation, server, or handheld computing device, such as a phone or tablet. The computer can include, for example, one or more of processor 910, input device 920, output device 930, storage 940, and communication device 960. Input device 920 and output device 930 can correspond to those described above and can either be connectable or integrated with the computer.

Input device 920 can be any suitable device that provides input, such as a touch screen or monitor, keyboard, mouse, or voice-recognition device. Output device 930 can be any suitable device that provides an output, such as a touch screen, monitor, printer, disk drive, or speaker.

Storage 940 can be any suitable device that provides storage, such as an electrical, magnetic, or optical memory, including a random-access memory (RAM), cache, hard drive, CD-ROM drive, tape drive, or removable storage disk. Communication device 960 can include any suitable device capable of transmitting and receiving signals over a network, such as a network interface chip or card. The components of the computer can be connected in any suitable manner, such as via a physical bus or wirelessly. Storage 840 can be a non-transitory computer-readable storage medium comprising one or more programs, which, when executed by one or more processors, such as processor 910, cause the one or more processors to execute methods described herein.

Software 950, which can be stored in storage 940 and executed by processor 910, can include, for example, the programming that embodies the functionality of the present disclosure (e.g., as embodied in the systems, computers, servers, and/or devices as described above). In one or more examples, software 950 can include a combination of servers such as application servers and database servers.

Software 950 can also be stored and/or transported within any computer-readable storage medium for use by or in connection with an instruction execution system, apparatus, or device, such as those detailed above, that can fetch and execute instructions associated with the software from the instruction execution system, apparatus, or device. In the context of this disclosure, a computer-readable storage medium can be any medium, such as storage 940, that can contain or store programming for use by or in connection with an instruction execution system, apparatus, or device.

Software 950 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 900 can implement any operating system suitable for operating on the network. Software 950 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

As used herein, the singular forms "a", "an", and "the" include the plural reference unless the context clearly dictates otherwise. Reference to "about" a value or parameter herein includes (and describes) variations that are directed to that value or parameter per se. For example, description referring to "about X" includes description of "X". It is understood that aspects and variations of the invention described herein include "consisting of" and/or "consisting essentially of" aspects and variations.

When a range of values or values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A system for processing relational database data using a generative artificial intelligence (AI) language model, the system comprising one or more processors and memory storing instructions that, when executed by the one or more processors, cause the system to:
   receive relational database data;
   generate, based on the relational database data, schema data in text string format;
   receive a user query input;
   generate and provide a first prompt to a generative AI language model, wherein the first prompt is generated based on the user query input and based on the schema data;
   receive, from the generative AI language model, in response to the first prompt, an indication of a first subset of the database data that is identified as relevant to the user query;
   generate and provide a second prompt to the generative AI language model, wherein the second prompt is generated based on the user query input and based on the identified first subset of the database data; and
   receive, from the generative AI language model, in response to the second prompt, an output comprising insight data generated based on the user query input and based on the identified first subset of the database data.

2. The system of claim 1, wherein the insight data is textual.

3. The system of claim 1, wherein the insight data is visual.

4. The system of claim 1, wherein the instructions cause the system to apply a denormalization operation to the relational database data.

5. The system of claim 4, wherein the denormalization operation comprises computation of one or more adjacency matrices.

6. The system of claim 5, wherein the instructions cause the system to use a Depth-First Search (DFS) algorithm to traverse the one or more adjacency matrices.

7. The system of claim 1, wherein:
   the instructions cause the system to:
      generate a correlational matrix based on the database data, wherein the correlational matrix represents a plurality of correlations between a plurality of subsets of the database data; and
      identify, based on the identified first subset of the database data that is identified as relevant to the user query, and based on the correlational matrix, a second subset of the database data that is relevant to the user query;
   the second prompt is generated based on the first and second subset of the database data; and
   the output comprising insight data is based on the first and second subset of the database data.

8. The system of claim 7, wherein the instructions cause the system to calculate one or more correlations using a Chi-Square test.

9. The system of claim 7, wherein the instructions cause the system to calculate one or more correlations using a Pearson coefficient.

10. The system of claim 7, wherein the instructions cause the system to calculate one or more correlations using an analysis of variance technique.

11. The system of claim 7, wherein identifying a second subset of the database data comprises placing a lower limit on correlation values.

12. The system of claim 1, wherein:
the instructions cause the system to:
retrieve data content from the database based on the identified first subset of the database data; and
apply a data modification operation to generate a compressed representation of the retrieved data content;
the second prompt is generated based on the compressed representation of the retrieved data content; and
the output comprising insight data is based on the portion of the retrieved data content.

13. The system of claim 12, wherein the data modification operation comprises a filtering operation that selects a portion of the retrieved data content.

14. The system of claim 13, wherein the filtering operation is based on the cardinality of the retrieved data content.

15. The system of claim 12, wherein the data modification operation comprises sorting the retrieved data content based on cardinality.

16. The system of claim 12, wherein the data modification operation comprises forming a grouping of retrieved data content using a sliding window technique.

17. The system of claim 16, wherein the data modification operation comprises application of an aggregation function to the grouping of retrieved data content.

18. The system of claim 17, wherein the instructions cause the system to select the aggregation function based on the schema data.

19. The system of claim 1, wherein the instructions cause the system to:
generate and provide a third prompt to the generative AI language model, wherein the third prompt is generated based on the user query input and based on the identified first subset of the database data; and
receive, from the generative AI language model, in response to the third prompt, an output comprising a visualization data generated based on the user query input and based on the identified first subset of the database data.

20. The system of claim 19, wherein the instructions cause the system to receive a visualization from the generative AI language model based on the visualization data.

21. The system of claim 19, wherein the instructions cause the system to receive a visualization from a visualization engine based on the visualization data.

22. A method for processing relational database data using a generative artificial intelligence (AI) language model, the method performed by a system comprising memory and one or more processors, the method comprising:
receiving relational database data;
generating, based on the relational database data, schema data in text string format;
receiving a user query input;
generating and providing a first prompt to a generative AI language model, wherein the first prompt is generated based on the user query input and based on the schema data;
receiving, from the generative AI language model, in response to the first prompt, an indication of a first subset of the database data that is identified as relevant to the user query;
generating and providing a second prompt to the generative AI language model, wherein the second prompt is generated based on the user query input and based on the identified first subset of the database data; and
receiving, from the generative AI language model, in response to the second prompt, an output comprising insight data generated based on the user query input and based on the identified first subset of the database data.

23. A non-transitory computer readable storage medium storing instructions for processing relational database data using a generative artificial intelligence (AI) language model, wherein the instructions, when executed by one or more processors of an electronic device, cause the device to:
receive relational database data;
generate, based on the relational database data, schema data in text string format;
receive a user query input;
generate and provide a first prompt to a generative AI language model, wherein the first prompt is generated based on the user query input and based on the schema data;
receive, from the generative AI language model, in response to the first prompt, an indication of a first subset of the database data that is identified as relevant to the user query;
generate and provide a second prompt to the generative AI language model, wherein the second prompt is generated based on the user query input and based on the identified first subset of the database data; and
receive, from the generative AI language model, in response to the second prompt, an output comprising insight data generated based on the user query input and based on the identified first subset of the database data.

* * * * *